March 7, 1950  E. OLSON  2,499,674
HYDROSTATIC LIQUID LEVELOMETER
Filed Nov. 4, 1947  2 Sheets-Sheet 1
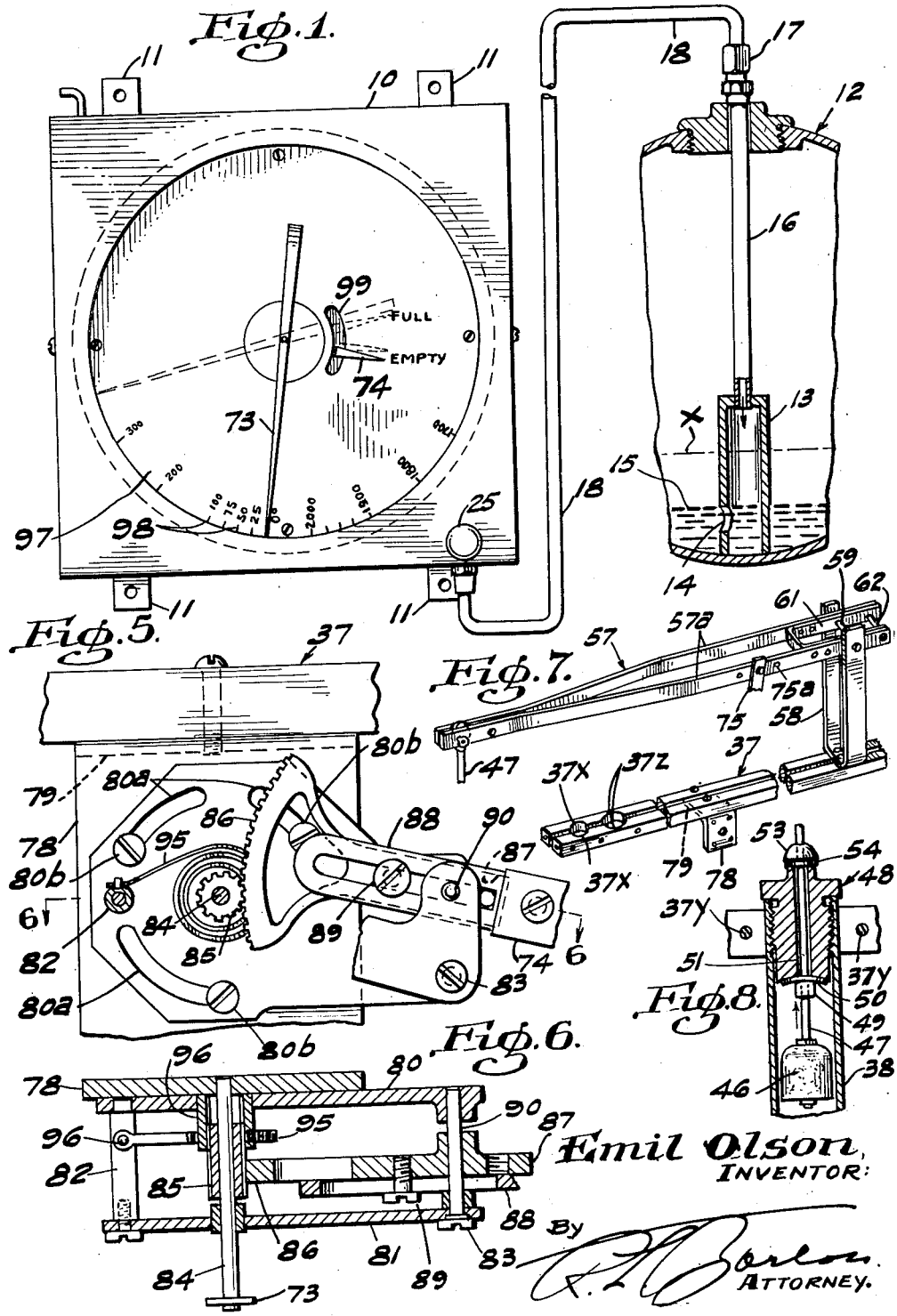
Emil Olson, INVENTOR March 7, 1950
E. OLSON
2,499,674
HYDROSTATIC LIQUID LEVELOMETER
Filed Nov. 4, 1947
2 Sheets-Sheet 2
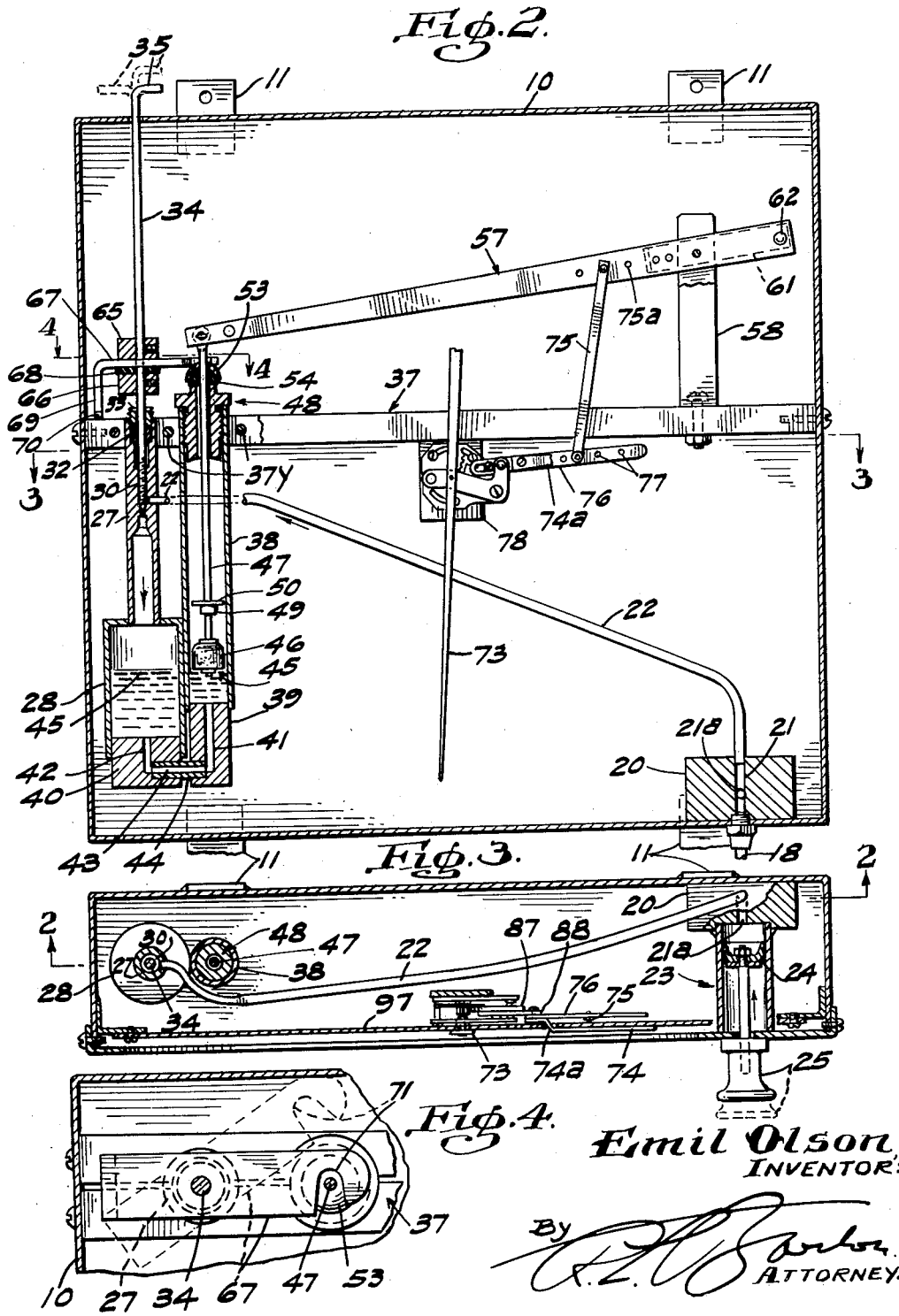
Emil Olson, INVENTOR.

Patented Mar. 7, 1950

2,499,674

UNITED STATES PATENT OFFICE 2,499,674

HYDROSTATIC LIQUID LEVELOMETER

Emil Olson, Los Angeles, Calif.

Application November 4, 1947, Serial No. 784,055

7 Claims. (Cl. 73—302)

This invention relates to a hydrostatic liquid levelometer.

One important object of the invention is to provide means to use an expensive pressure-indicating liquid like mercury without such liquid being forced from its proper, housed-in position, and also to prevent the mercury from being displaced or wasted when the device is being transported from one place to another.

Another object of the invention is to provide improved means for regulating the apparatus so as to adapt it for use in indicating the liquid levels in tanks containing liquids of different specific gravities.

Still another object relates to an improved dual pointer indicating means wherein a main pointer and an auxiliary pointer cooperate in such a manner as to safeguard against a misreading of the pressures designated by the main pointer.

Other objects, advantages and features of invention will hereinafter appear.

Referring to the accompanying drawings, which illustrate a preferred embodiment of the invention, Fig. 1 is a part side elevation and part section of the apparatus looking at the face of the dial carried thereby, and including a fragment of the storage tank.

Fig. 2 is a vertical section on angular line 2—2 of Fig. 3 the scale being larger than that of Fig. 1.

Fig. 3 is a horizontal section on irregular line 3—3 of Fig. 2.

Fig. 4 is a sectional detail showing, in plan, a locking member to safeguard the escape of the pressure-indicating mercury, the plane of section being on line 4—4 of Fig. 2, said locking member being shown on a larger scale than that of the latter view.

Fig. 5 is an enlarged elevational detail of a part of the mechanism for operating the liquid level indicating pointer.

Fig. 6 is a section on irregular line 6—6 of Fig. 5.

Fig. 7 is a perspective detail of the indicator operating lever and adjacent parts.

Fig. 8 is an enlarged reproduction, partly in elevation, of the mercury sealing means shown in the left hand portion of Fig. 2.

Referring in detail to the drawings, in Fig. 1 is shown the indicator casing 10 furnished with a plurality of apertured ears 11 to receive fastening means to secure said casing to a vertical instrument panel, wall or other suitable support. In this view is also shown a fragment of a closed-in tank 12, containing in its lower part an upstanding pressure "bell" of tube 13 having a single lateral aperture 14 communicating with the liquid 15 in the lower portion of the tank. The lower end of said tube 13 rests on the bottom of the tank 12. From the bell's closed upper end leads a vertical pipe 16 up through a fitting which affords an air tight connection between the pipe and tank. Above said fitting said pipe 16 is united by a union 17 with the adjacent end of an angular pipe 18, the opposite end of said pipe 18 leading upwardly into the aforesaid indicator casing 10.

Superjacent to the point at which said pipe 18 enters the indicator casing 10 is anchored a block 20, see Figs. 2 and 3, which has through it a vertical passage 21 which at its lower end communicates with said pipe 18, and which communicates at its upper end with an inclined pipe 22, desirably copper tubing. Said block 20 also contains a horizontal passage 21a, the latter passage communicating with a pump cylinder 23 made integral with or secured in some suitable manner to said block, and within said cylinder 23 operates a pump piston 24 manually operable by means of a handle 25. This pump structure is of the well known bicycle pump type.

The aforementioned inclined pipe or tube 22 leads across the interior of the casing 10 to a point near the opposite side thereof where said pipe communicates with the interior of a tubular extension 27 which upstands from the closed-in mercury tank 28. Within the part of said extension opposite to said tube 22 is formed an axial passage 30, the upper portion of which is threaded and the lower portion of which is plain. At the upper end of the plain passage is a needle valve seat and it is at this point or slightly thereabove that the tube 22 communicates with said axial passage 30.

The upper end of the tubular part 27 is closed fluid tight by means of packing 32 and nut 33 through both of which passes the manually rotatable needle 34, said needle having a screw-threaded portion to cooperate with the threaded portion of said axial passage 30 and a pointed portion to rest, at times, upon said needle valve seat and close communication with the aforesaid tube 22. The needle is extended above this part of the structure through the top of the casing 10 above which it has an angularly directed terminus 35 whereby it is manually turnable.

The aforementioned upstanding tubular part 27 has its upper end portion tightly fitted into a vertical passage through a two-part horizontal mounting bar 37, said bar also serving as a mounting means for a number of other parts presently to be described. This vertical passage through the bar 37 is produced by forming opposed semicircular seats 37x (shown in Fig. 7) in each side portion of said two-part bar, said side portions being clamped together by rivets or peened pins 37y. Said mounting bar 37 also has, likewise, through it semicircular seats 37z forming a vertical passage into which is fitted and secured the upper end portion of a vertically elongated tubular float-containing casing 38 the lower part of which abuts laterally against the side of the mercury tank 28, and the upper part of which is in a parallel, spaced relation to the upper end of the tubular extension 27 of said tank 28.

In order to maintain a liquid communication between the lower portions of the tubular members 28 and 38 the latter member has fitted into its lower end the upper extremity of an elongated plug 39 and the former has fitted into its lower end a drum-shaped plug 40. These plugs are respectively provided with axial passages 41 and 42 which are connected by a cross passage 43 through a pressed-in tube 44. The level of the mercury 45 is thus maintained at the same level in the tubular parts 28 and 38, unless subjected to pressure from the outside.

In the casing member 38 is a float 46 carried by the lower end portion of a rod 47, the upper end portion of said rod extending axially through and at all times projecting above a packed cap structure 48. Between this cap structure and the float the rod 47 carries a friction tight collar 48 to the upper side of which is fastened flexible means comprising a flexible washer or disk 50 which at times (see Fig. 8) abuts against the lower concaved end of the plug-carrying cap structure 48 to close the annular working clearance 51 therein around the rod 47.

Spaced downwardly somewhat from its upper end the float rod 47 has secured to it in a friction tight manner a dome shaped collar 53 carrying on its under face a rubber gasket 54.

At its upper end the float rod 47 is pivotally connected to the free end portion of a lever 57, best shown in Fig. 7 where the opposite end portion of said lever is shown pivoted to and between the limbs of a U-shaped standard 58 by a pin 59 insertable through pivot holes in the twin metal straps 57a which form the side portions of said lever. At the free end of the lever said straps 57a abut laterally for a short distance, then they gradually diverge and at the opposite end of the lever are spaced apart by a U-shaped spacer strip 61. A tie pin 62 at the adjacent extremity of the lever passes through the two lever limbs 57a and the open end portion of said spacer strip 61. The base portion of the standard 58 is bolted to the two-part mounting bar 37.

Superjacent to the mounting bar 37 the needle 34 has pinned to it with a slip fit an upper block 65 and a lower block 66, an angular, strap metal locking bar 67 being clamped between these two blocks, the clamping action being cushioned by a layer of rubber 68. One end portion of said locking arm is downwardly deflected at a right angle to form a foot 69 with a convex sole portion 70 which rides, at times, upon the bar 37. The opposite end portion of this locking bar is laterally notched at 71, see Fig. 4, to swing at times into a locking relation to the cap structure 53 at such times to maintain said cap structure in a sealing relation to the annular clearance 51, see Fig. 8, around the rod 47.

The device is provided with a main indicating pointer 73 and an auxiliary indicating pointer 74, with operating connections now to be described. A motion transmission link 75 has its upper end pivoted to the lever 57 in an adjustable manner through the medium of holes 75a in relation to the length of the lever in order to adapt the device for use in indicating the liquid levels in tanks containing liquids of different specific gravities. The lower end of said link 75 is likewise pivoted to a more or less horizontal arm 76 swingable in a vertical plane and having through it a longitudinal series of pivot holes 77 so that the link and arm may be pivoted to each other in an adjustable manner to aid in the just stated function. Said auxiliary pointer 74 has an offset shank 74a which passes through a slot in the face of the dial and is secured to the arm 76 as shown in Figs. 1 and 3.

At about the midlength of the mounting bar 37 there is secured thereto a pendant bracket. This bracket comprises a hanger plate shaped as an inverted L, and hence consisting of a vertical leg 78 and a horizontal leg 79, the latter leg being bolted to the mounting bar 37. Side plates 80 and 81, see Fig. 6, secured to each other by bolts 82 and 83, provided a mounting frame for the main pointer 73 and the already mentioned arm 76 together with associated parts. Said plate 80 has through it a circumferentially arranged series of arcuate slots 80a through which to receive screws 80b to adjustably secure the plate 80 to the vertical leg 78. A horizontal pin 84 extends turnably through said mounting frame, said pin having a projecting end portion to which the pointer 73 is secured. Said pin 84 has axially secured to it an elongated pinion gear 85 which meshes with a toothed segment 86 having a shank 87 in an overlapping relation to a slotted end portion of an adjustable slide 88 fastened to the aforesaid arm 76. Said slotted arm portion 88 is adjustably secured to the segment's shank 87 by means of a set screw 89. A pintle 90, passing through projecting portions of the aforesaid frame plates 80 and 81, passes through the slotted part 88 and pivotally supports it together with the shank 87 of the toothed segment 86, the parts 80 and 87 being suitably thickened, as shown, to provide a good bearing around said pintle.

A watch spring type of leaf spring 95 has its coiled portion attached to a hub or sleeve 96 carried by the pin 84 and has its free end portion anchored to the pins 82 and 96. Said spring is utilized for the purpose of taking up any lag due to clearances existing among the correlated parts of this mechanical movement.

As shown in Fig. 1, the dial face 97 has inscribed upon it numbered liquid pressure indicating graduations 98 with which cooperates the main pointer 73. Also there is, through the face of the dial a segmental slot 99 to afford a working clearance for the aforesaid off-set portion of the auxiliary pointer 74. Said auxiliary pointer points to "Full" and "Empty" when the main pointer is positioned adjacent to the limits of its travel, thus safeguarding against misreading the pressure indications designated by said main pointer.

In the operation of the apparatus, assuming that the mercury is at the level 45 in the mercury housing and water (or other liquid) 15 is at the level X in the storage tank, and it is desired to take a reading of the liquid level in the tank 12, the pump 23 will be put into operation, thus forcing outside air through the passage 22 and thence through tubes 18 and 16 into the upper part of the tubular member or "bell" 13 until the liquid level therein has been forced down to the upper edge of the opening 14. While this is taking place air will be forced through the tube 22 in the indicator casing and thence into the upper part of the closed-in mercury chamber means which includes the mercury chamber 28, until mercury forced out of said chamber will be by-passed into the float cylinder 38 in sufficient quantity to correspond with the air pressure at the same time required to force the air from the aforesaid opening 14 in the tubular member 13. Consequently the buoyed up float 46 will at the same time actuate the operating connections between it and the indicating pointers, so that (assuming a proper adjustment has been made of said operative connections) said pointers will truly indicate the liquid level in the tank 12. The mercury cannot be discharged from the float chamber due to abnormal conditions because the washer 50 keeps it from escaping through the annular clearance 51 around the float rod.

When, for example, it is desired to transport the device from one place to another, the closed-in mercury chamber may be sealed off by manually rotating the needle 34 exteriorly of the casing. Clockwise rotation of the needle through the medium of the terminus 35 through less than a complete turn will rotate the locking bar 67 until its notched end comes into an overlying relation to the cap collar 53 with the float rod 47 being embraced in the notch 71 as shown in Fig. 4. Further rotation in the same direction will advance the needle's point downwardly at the same time carrying the locking bar downwardly with it until the sole portion 70 of its deflected arm 69 rests upon the support 37, at such time the notched opposite end of the locking bar will press on the collar 53 urging the gasket 54 into a fluid tight relation with the annular clearance 51 around the float rod 47 as shown in Fig. 8. When the latter condition occurs the needle can still be further advanced until the needle's point rests upon its seat as a result of the slip fit of the needle with the two blocks 65 and 66 and the locking bar 67.

When it is desired to adjust the apparatus so as to adapt it for indicating the liquid levels in tanks containing different specific gravities, the motion transmission link 75 is adjusted accordingly through the medium of the holes 75a and 77.

It should be understood that the present disclosure is for the purpose of illustration only and that this invention includes all modifications and equivalents which fall within the scope of the subject matter claimed.

I claim:

1. In an apparatus of the kind described, an indicator casing, a mercury tank mounted in said casing, said mercury tank having an upward extension to receive air under pressure, housing means containing a float chamber adjacent to said mercury tank, a float in the latter chamber, there being a passage placing the lower chamber portions of said mercury tank and float chamber portions into communication with each other so that air introduced into said mercury tank under pressure will cause mercury to flow into said float chamber and raise said float, said float chamber being a vertically elongated tube, an axial float carrying rod in said tube at all times projecting from its upper end, a cap carried by the upper end portion of said float chamber and having a plug portion extending downwardly thereinto, said plug portion having through it an axial passage providing an annular working clearance around the float rod, a flexible washer carried by said float rod and frictionally adjustable therealong, when the float is in an elevated position said washer abutting against the lower end of said plug portion to prevent outflow of mercury therethrough, an indicating dial carried by said indicator casing, a pointer mounted upon said casing in a cooperative relation to said dial, and an operating connection between said float rod and pointer.

2. The subject matter of claim 1 and, said lower end of said plug being concaved, and said washer assuming a cupped condition when projected thereagainst by said float.

3. The subject matter of claim 1, and, a dome shaped collar secured to said float rod in a friction tight manner superjacent said cap and carrying on its under face a gasket adapted at times to seal said annular working clearance around said float rod where it projects through said cap, and means carried by said casing and swingable at times into a locking relation to said collar at such times to maintain said gasket in a sealing relation to said annular clearance.

4. The subject matter of claim 1 and, there being an axial passage in said extension a portion of which is threaded and a portion of which is plain, a needle valve seat in said axial passage intermediate said threaded and plain portions thereof, and a manually operable needle having a threaded portion to cooperate with the threaded portion of said axial passage and a point portion to rest, at times, upon said needle valve seat, ingress for said air under pressure into said extension being located superjacent said needle valve seat.

5. The subject matter of claim 1 and, there being an axial passage in said extension a portion of which is threaded and a portion of which is plain, a needle valve seat in said axial passage intermediate said threaded and plain portions thereof, a manually operable needle having a threaded portion to cooperate with the threaded portion of said axial passage and a point portion to rest, at times, upon said needle valve seat, ingress for said air under pressure into said extension being located superjacent said needle valve seat, and means closing fluid tight the upper end of said extension, said needle projecting through said closure means and therebeyond through the top of said casing and having an angularly directed terminus whereby it is manually turnable.

6. In an apparatus of the kind described, an indicator casing, a mercury tank mounted in said casing, said mercury tank having an upward extension to receive air under pressure, housing means containing a float chamber adjacent to said mercury tank, a float in the latter chamber, there being a passage placing the lower portions of said mercury tank and float chamber into communication with each other so that air introduced into said mercury tank under pressure will cause mercury to flow into said float chamber and raise said float, said float chamber being a vertically elongated tube, an axial float carrying rod in said tube at all times projecting from its upper end, a cap carried by the upper end portion of said float chamber and having a plug portion extending downwardly thereinto, said plug portion having through it an axial passage providing an annular working clearance around the float rod, a flexible washer carried by said float rod and frictionally adjustable therealong, when the float is in an elevated position said washer abutting against the lower end of said plug portion to prevent outflow of mercury therethrough, an indicating dial carried by said indicator casing, a pointer mounted upon said casing in a cooperative relation to said dial, an operating connection between said float rod and pointer, there being an axial passage in said extension a portion of which is threaded and a portion of which is plain, a needle valve seat in said axial passage of said extension intermediate said threaded and plain portions thereof, a manually operable needle having a threaded portion to cooperate with the threaded portion of said axial passage of said extension and a point portion to rest at times, upon said needle valve seat, ingress for said air under pressure into said extension being located superjacent said needle valve seat, means closing fluid tight the upper end of said extension, said needle projecting through said closure means and therebeyond through the top of said casing and having an angularly directed terminus whereby it is manually turnable, a dome shaped collar secured to said float rod in a friction tight manner superjacent said cap and carrying on its under face a gasket adapted at times to seal said annular working clearance around said float rod where it projects through said cap, and means carried by said needle superjacent said closure means and swingable at times into a locking relation to said collar, at such times to maintain said gasket in a sealing relation to said annular clearance, said means carried by said needle when rotated into a locking relation to said collar unobstructing the screwing downwardly of said needle upon its seat.

7. The subject matter of claim 6 and, said means carried by said needle comprising an upper block and a lower block mounted upon the needle with a slip fit, an angular strap metal locking bar clamped between said two blocks, the clamping action being cushioned by a layer of rubber therebetween, one end portion of said locking bar being deflected downwardly at a right angle to form a foot with a convex sole portion which at times rests upon a support carried by said casing, the opposite end portion of said locking bar being laterally notched to embrace said float rod when said locking bar is swung into a locking relation to said dome shaped collar.

EMIL OLSON.

REFERENCES CITED

The following references are of record in the file of this patent:

UNITED STATES PATENTS

| Number | Name | Date |
|---|---|---|
| 1,368,187 | Murphy | Feb. 8, 1921 |
| 1,560,350 | Seferlis | Nov. 3, 1925 |
| 1,596,774 | Star | Aug. 17, 1926 |
| 1,907,473 | Bailey | May 9, 1933 |

FOREIGN PATENTS

| Number | Country | Date |
|---|---|---|
| 32,306 | France | June 14, 1927 |
| | (Addition to No. 597,920) | |
| 597,920 | France | Sept. 12, 1925 |